United States Patent [19]
Wayner et al.

[11] Patent Number: 5,121,366
[45] Date of Patent: Jun. 9, 1992

[54] UNDERWATER COMMUNICATION SYSTEM

[75] Inventors: Brian D. Wayner, Shelton; Christopher W. Withers, Thomaston, both of Conn.

[73] Assignee: United Technologies Corporation, Hartford, Conn.

[21] Appl. No.: 629,869

[22] Filed: Dec. 19, 1990

[51] Int. Cl.⁵ .......................................... H04B 11/00
[52] U.S. Cl. ................................................... 367/134
[58] Field of Search ................... 367/131, 134; 375/6; 455/40

[56] References Cited

U.S. PATENT DOCUMENTS 4,679,177  7/1987  Aoyagi et al. .................... 367/134

*Primary Examiner*—Daniel T. Pihulic
*Attorney, Agent, or Firm*—Michael Grillo

[57] ABSTRACT

An underwater communication system provides reliable underwater transmission of digitally encoded communications as a series of consecutive acoustic frequency pulses (40) wherein the frequency of each pulse corresponds to one of two preselected frequency settings ($F_A, F_B$). A communication is transmitted as a series of frequency pulses (40) divided into a header section (44), a message section (45), and a parity bit (46). The header bits are of a first pulse width (T1), and the message and parity bits are of a second pulse width (T2). Received communications are converted into an electrical receive signal by a hydrophone (76), which is processed by a sonar control (61) and provided to a CPU (62) which decodes the communication for display on a display unit (60).

2 Claims, 3 Drawing Sheets

UNDERWATER COMMUNICATION SYSTEM

DESCRIPTION

1. Technical Field

This invention relates to underwater communications, and more particularly to an underwater communication system for rapid and reliable underwater transmission of high data rate, digital messages.

2. Background Art

Underwater communication between a helicopter or a ship and a submarine, or between a pair of submarines, has traditionally been accomplished with either explosive charges or underwater telephones. Communication with explosive charges involves the underwater detonation of one or a plurality of small charges for signaling the submarine. Acoustic emissions generated by the detonations permeate through the water, and are detected by a submarine to provide an indication that either a ship or helicopter is attempting to communicate with the submarine.

The amount of information which may be communicated by the helicopter or ship is limited by the number of detonations, and if the submarine is not in close proximity to the location of the detonations, the signal may be confused due to reverberations in the water. Additionally, the submarine may be required to establish radio communications with the signaling helicopter or ship if a response to the explosive communication is required. Therefore, this type of communication may compromise the covertness of the submarine by requiring it to surface or reduce depth and raise a communications mast in order to establish radio communications.

Underwater telephones provide a method of voice communication using a modulated voice signal on a carrier frequency. Underwater telephones are functionally similar to a conventional telephone with the exception that the signal is transmitted through the water, e.g., acoustic transmissions, rather than over wire.

An electrical transmitter signal generated by the underwater telephone on the sending platform (e.g., a helicopter or ship) is provided to a submerged sonar having underwater telephone capabilities. The sonar transmits an acoustic signal in response to the transmitter signal. As used herein, the term sonar is intended to refer to known sonar systems, e.g., a dipping sonar on a helicopter or a trailing or hull mounted sonar on a ship or submarine. Sonar systems include one or more transducers for sending and receiving sound, electronic equipment for the generation and detection of electrical impulses to and from the transducers, and signal processing means coupled to display means for analysis and display of received signals.

Underwater telephone signal transmission is accomplished using a sonar transducer array, commonly known as a projector, which converts the electrical transmitter signal into motion of a mechanical transducer surface, thereby producing acoustic waves in the water. Another transducer array on the receiving platform, e.g., the submarine, commonly known as a hydrophone, receives the acoustic waves, thereby inducing motion of the hydrophone mechanical surface, which motion is converted to an electrical receiver signal. The electrical receiver signal is essentially a reconstructed electrical transmitter signal, and is converted to a voice signal by the submarine's underwater telephone system.

The range of the underwater telephone is limited because of transmission losses during sound propagation through the water. Also, because the underwater telephone uses an analog signal, any modification or modulation of the signal directly results in distorted or garbled messages. Sources of distortions include self-noise caused by motion of the sonar through the water, reverberations caused by thermal gradients in the water and the reflection of sound waves off of underwater surfaces, and background noise caused by biologics and other ships. The lack of clarity of analog signal transmission through the water greatly reduces the reliability of communication using the underwater telephone. Additionally, underwater telephone voice transmissions are low data rate communications, thereby increasing the time that a submarine is required to remain in a particular location to transmit and/or receive a communication.

DISCLOSURE OF THE INVENTION

Objects of the present invention include provision of reliable underwater communications having an increased data transmission rate and improved resistance to distortions during underwater signal propagation.

According to the present invention, an encoded communication is transmitted underwater as a series of consecutive acoustic frequency pulses, the frequency of each pulse being equal to a first frequency or a second frequency different from the first frequency, the series of consecutive acoustic frequency pulses representing a series of binary data bits.

The present invention provides reliable underwater communication between a ship or a helicopter and a submarine or between a pair of submarines. Because the system uses digital communications transmitted at a high data rate, critical orders can be rapidly and reliably transmitted, received, and decoded. Moreover, communication is available over a greater distance than the prior art communication systems, i.e. the underwater telephone or the explosive charge method, because communication frequencies can be selected which have reduced attenuation during propagation through the water. Additionally, because the communication system of the present invention uses digital messages, message transmissions are much more tolerant to the effects of self noise and reverberations, thereby improving the reliability of signal transmission.

The foregoing and other objects, features and advantages of the present invention will become more apparent in light of the following detailed description of exemplary embodiments thereof, as illustrated in the accompanying drawing.

BEST MODE FOR CARRYING OUT THE INVENTION

The underwater communication system of the present invention is particularly useful for communication of information between a ship or helicopter and a submarine, or between a pair of submarines. The system may be used with the projector and hydrophone of an existing sonar unit, or with projectors and hydrophones used only for communication with the system of the invention.

Figure 1:
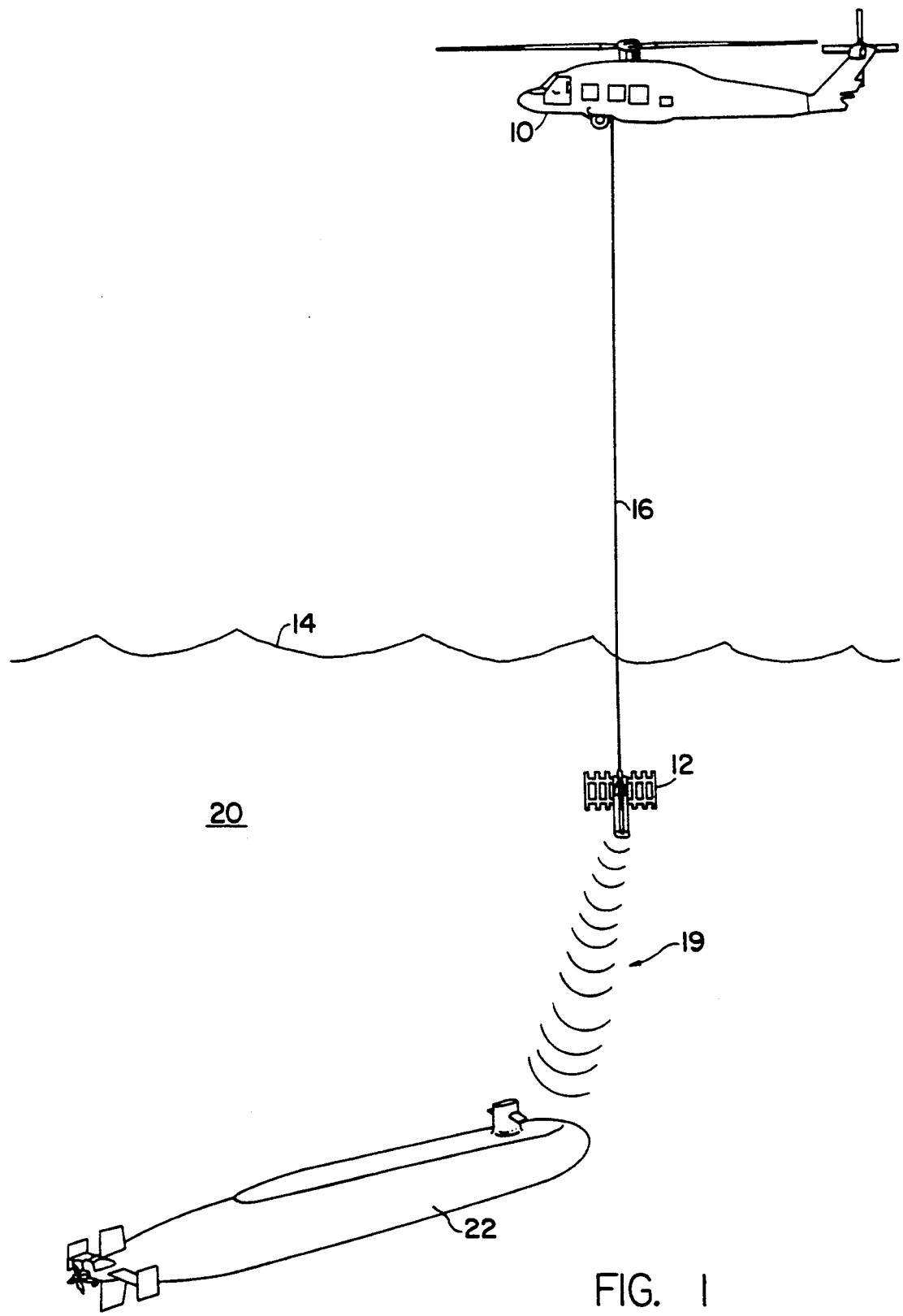
FIG. 1 is a perspective view of a helicopter communicating with a submarine using the communication system of the present invention.

Referring now to FIG. 1, a helicopter 10 is illustrated as having a dipping sonar unit 12 suspended below the water surface 14 by a sonar cable 16. The sonar 12 is controlled by the communication system of the invention to transmit a series of frequency pulses in the form of acoustic sound waves 19. The acoustic sound waves 19 permeate through the water 20 and are received by a hydrophone (not shown) on a submarine 22.

Figure 2:
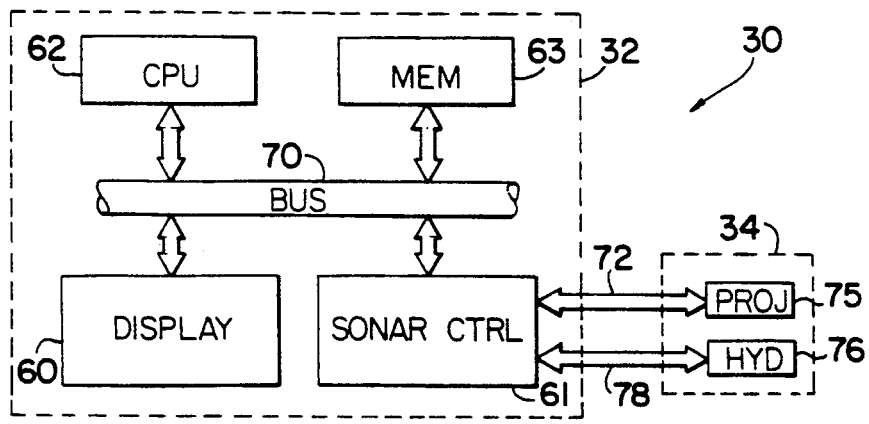
FIG. 2 is a simplified schematic block diagram of an exemplary embodiment of the communication system of the present invention.

Referring to FIG. 2, the underwater communication system 30 comprises a control unit 32 and a transceiver 34. The control unit 32 controls a projector 75 in the transceiver 34 for transmitting encoded communications in the form of acoustic transmissions. The control unit 32 also decodes acoustic transmissions received by a hydrophone 76 in the transceiver.

Figure 3:
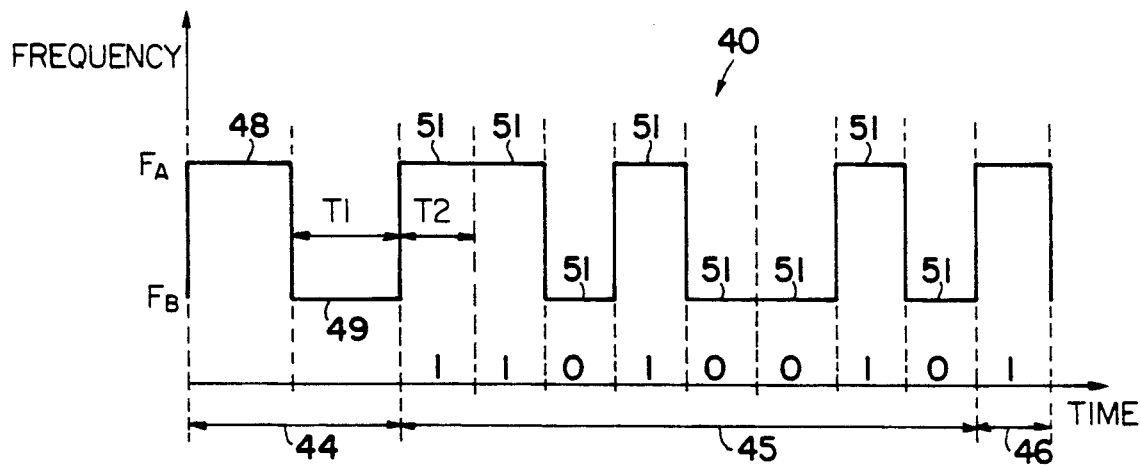
FIG. 3 is a waveform illustrative of an encoded communication sent using the system in FIG. 2.

Referring to FIG. 3, each acoustic transmission, i.e., encoded communication, is in the form of a series of frequency pulses 40, where the frequency of each pulse corresponds to one of two preselected frequency settings. A first frequency, $F_A$, is selected to represent a logic 1, and a second frequency, $F_B$, is selected to represent a logic 0. The series of pulses 40 is divided into three sections comprising a header 44, a message 45 and a parity bit 46.

The header section 44 is comprised of two bits, the first bit 48 corresponding to a logic 1, and the second bit 49 corresponding to a logic 0. Alternatively, the first header bit could correspond to a logic 0 and the second header bit could correspond to a logic 1. The header 44 is used to establish the start of the message 45 and the frequencies, $F_A,F_B$, chosen to be 1's and 0's in the message. The submarine is configured to receive all possible transmit frequencies of the helicopter dipping sonar.

The message 45 is comprised of a plurality of bits 51, wherein each combination of bits corresponds to a different specific message. In the exemplary embodiment herein, the message 45 is an eight bit binary word which implies the capability for 256 different messages; however, the invention will work equally as well with messages of different lengths, e.g., 12 bits, 16 bits, etc. Each bit 51 of the message 45 will correspond to a logic 1 or a logic 0, as determined by $F_A$ and $F_B$, to form the different words. Here the message is illustrated as having the value 11010010 which corresponds to the decimal numeral 210. The receiving platform may then use encryption material to convert the message into an order, e.g., "cease attack". Messages can be changed and/or encrypted as desired.

Following the message 45 is a parity bit 46. The parity bit 46 is used for error detection to ensure that the message 45 is intact. The parity bit 46 will be a logic 1 or a logic 0 as required to provide either odd or even parity. The exemplary embodiment is illustrated as having odd parity, i.e., the sum of the message logic one (1) bits and the parity bit is an odd number, i.e., $4+1=5$.

Each header bit 48,49 has a pulse width or time duration of T1. Thereafter, each message bit 51 and the parity bit 46 is of a second pulse width T2. In the exemplary embodiment herein, the first pulse width T1 is greater than the second pulse width T2 by a predetermined factor, e.g., $T1=3/2(T2)$. The difference in the pulse width of the header bits 48,49 and the pulse width of the remaining bits 51,46 allows the system to easily distinguish the message bits from the header bits when receiving a communication.

Figure 4:
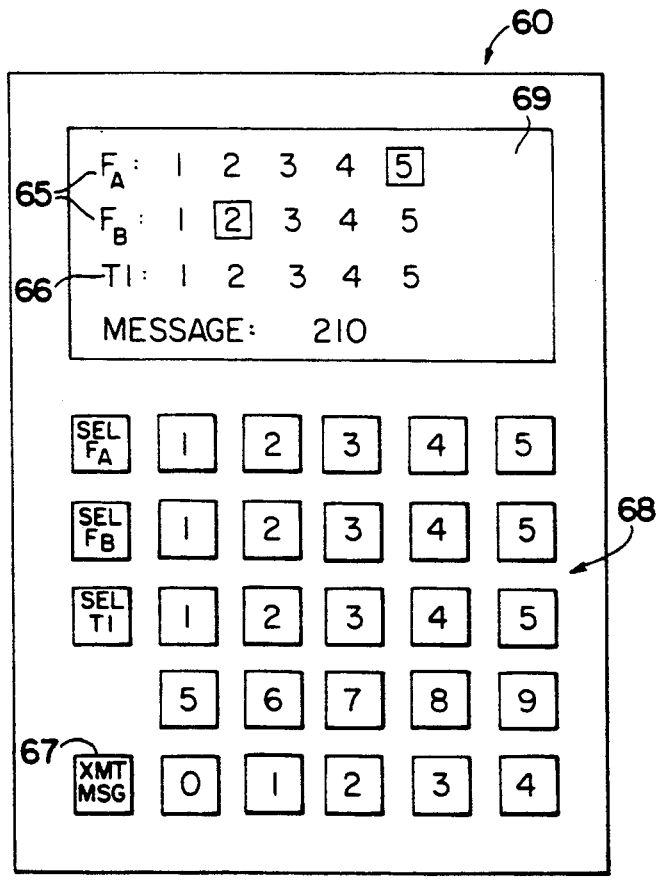
FIG. 4 is a perspective view of a control display unit of the system in FIG. 2.

Referring again to FIG. 2, the control unit 32 comprises a display unit 60, a sonar control 61, a central processing unit (CPU) 62 and a memory 63. The display unit 60 is illustrated in FIG. 4, and comprises a data entry keypad 68 and a display 69. The keypad 68 is used to select the header frequencies 48,49 (FIG. 3) and the pulse width or bit time duration T1,T2 (FIG. 3) and to cause the communication to be transmitted. The display 69 is used to display the system settings, e.g., frequency 65 and pulse width 66, and a received communication or a communication prior to transmission.

The communication system is functionally identical on both the sending and receiving platform, and, therefore, the transmit and receive operation of the invention will be described only with respect to a single platform. Referring more particularly to FIGS. 2 and 4, a communication is entered at the keypad 68 of the display unit 60 by first selecting the frequencies to represent a logic 1 and a logic 0, $F_A$ and $F_B$ respectively, and by selecting the pulse width T1 of the header bits. In the exemplary embodiment, the operator may select from five operating frequencies and five pulse width time intervals. The operator then converts the message he wished to send into a three-digit numeral from 000 through 255 using known cryptographic tables or equipment. The three-digit numeral is then entered at the keypad 68.

The operator transmits the message by pressing a key 67 on the keypad, and the three-digit numeral and the system settings are provided to the CPU 62 via a communications bus 70. The CPU 62 is also interconnected to the memory 63 via the communications bus 70. The memory stores algorithms and signal information for processing the communication. The CPU calculates T2 using T1, converts the three-digit numeral into a binary number, and assigns a parity bit, thereby forming an encoded communication. The communication is then provided to the sonar control 61 from the CPU 62 via the communications bus 70. In response to the communication, the sonar control 61 provides a transmit signal on lines 72 to the transceiver, causing the transceiver to transmit the communication in the form of an underwater acoustic transmission comprising a series of acoustic frequency pulses.

The acoustic transmission is received by a hydrophone and converted into an electrical receive signal. The output of the hydrophone is connected by lines 78 to the sonar control 61. The sonar control 61 processes the receive signal, e.g., using band pass filters, to provide a signal indicative of the encoded communication. The output of the sonar control 61 interfaces via the communication bus 70 with the CPU 62.

Figure 5:
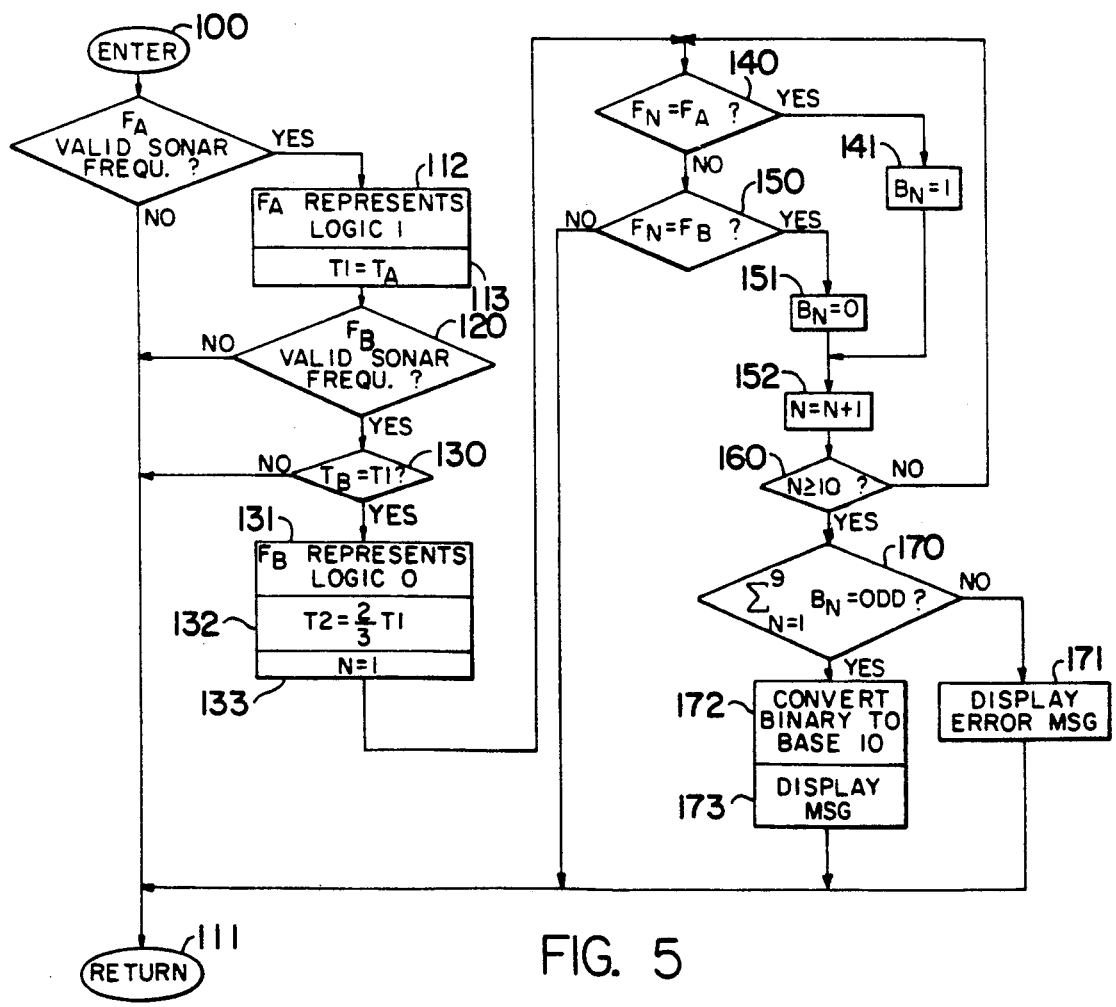
FIG. 5 is a flow diagram of a computer program executed by a microprocessor for implementing the communication system of the invention.

The CPU 62 then decodes the communication by executing an algorithmic subroutine of FIG. 5.

Referring to FIG. 5, when a communication is received by the CPU 62 from the sonar control 61, the subroutine is entered in a step 100, and the CPU checks if the first received frequenc $F_A$, is a valid sonar frequency. If $F_A$ is not a valid sonar frequency, the subroutine returns in a step 111. However, if $F_A$ is a valid sonar frequency, steps 112 and 113 are consecutively performed, wherein a logic 1 is represented b $F_A$ and the header pulse width T1 is set equal to the pulse width of $F_A$.

Next, the CPU checks if the second received frequency, $F_B$, is valid sonar frequency in a test 120. If $F_B$ is not a valid sonar frequency, the subroutine returns in the step 111. If $F_B$ is a valid sonar frequency, the CPU checks if the pulse width of $F_B$ is equal to T1 in a test 130. If the pulse widths are not equal, $F_A$ and $F_B$ do not form a valid header, and the subroutine returns in the step 111.

If the pulse widths of $F_A$ and $F_B$ are equal, a valid header has been received, and steps 131 through 133 are consecutively performed, wherein logic 0 is represented b $F_B$, pulse width T2 is set equal to two-thirds of T1, and a counter, N, is set equal to 1.

Next the CPU checks if the frequency received during the time period T2 following the header is equal to $F_A$. If the results of the test 140 are positive, bit 1 ($B_1$) of the message is set equal to 1 in a step 141. If the results of the test 140 are negative, the CPU checks if the frequency received during the time period T2 following the header is equal to $F_B$ in a test 150. If the results of the test 150 are negative, a valid message has not been received, and the subroutine returns in the step 111. If the results of the test 150 are positive, $B_1$ is set equal to 0 in a step 151. Once the logic state of $B_1$ is set in step 141 or step 151, N is incremented by 1 in a step 152. The CPU then checks if N is greater than or equal to 10 in a test 160. Initially, the counter will be less than 10, and the subroutine will return to test 140, wherein the logic level of the message bit during the second T2 time period, i.e., the bit 2 ($B_2$) logic level, is set equal to 1 in step 141 or equal to 0 in step 151.

The results of test 160 will continue to be negative until the logic state of all eight message bits, i.e., $B_1$ through $B_8$, and the parity bit, i.e., $B_9$, have been established, and the counter has been incremented to equal 10. Thereafter, the affirmative results of test 160 will reach a test 170 in which the CPU checks if the sum of the message bits and the parity bit is an odd number. Negative results of test 170 will reach a step 171 wherein an error message is sent to the display. This indicates that an error was detected in receiving the message using the parity bit. Affirmative results of test 170 will reach steps 172 and 173 wherein the eight bit binary message is converted into a three-digit decimal numeral which is thereafter sent to the display unit. The subroutine then returns in the step 111.

Referring again to FIG. 2, the three-digit numeral communication is transmitted via the communication bus 70 from the CPU 62 to the display 69. The receiving operator can then use known cryptographic equipment to decode the three-digit numeral into a command or order:

The communication system of the present invention is particularly useful for either one-way or two-way communication. Two-way communication is particularly useful for example to communicate during exercise operations. Since the duration of a communication is short, a submarine is not required to stay in a particular location very long in order to communicate. However, communication by the submarine may sacrifice its covertness in that acoustic transmissions can be traced back to the submarine.

One-way communication is particularly useful for the rapid and reliable transmission of critical orders to a submarine by a helicopter or a ship. Additionally, one-way communication using the communication system of the present invention may also be used for identification friend or foe (IFF) where a sending platform, e.g., a ship or helicopter, transmits a communication to a submarine requiring a predetermined response, e.g., the performance of a specified maneuver. If the submarine performs the specified maneuver, it will be deemed a friend. However, if the submarine fails to perform the specified maneuver, it will be deemed a foe. Presently, submarines are required to comply with relatively stringent location requirements for identification of friendly submarines by location. An IFF system employing the communication system of the present invention allows easy identification of friendly submarines without such stringent location requirements.

Another use of the present invention is in a search and identify system wherein communications of the invention are interspersed with standard sonar search signals. The search and identify system is implemented by selecting two of the five available sonar frequencies for the encoded communication and selecting a third frequency for the standard sonar search mode. A submarine will detect both the acoustic waves indicative of the encoded communication and the acoustic waves indicative of the sonar pulse for searching. Due to the unique format of the encoded communication, the submarine computer, following the algorithm of FIG. 5, will be able to identify the encoded communication versus other signals detected. An advantage of interspersing the encoded communication with the standard sonar search pulses is that the encoded communication is masked and less likely to be detected thereby preventing recognition of the communication by an intruder.

Yet another feature of the present invention is that it may be used for bistatic sonar operations. Bistatic sonar operation requires a transmitting platform, e.g., a ship, and a receiving platform, e.g., a submarine, for the detection of a third intruder platform, e.g., an intruder submarine The present invention allows for the detection of the intruder submarine by the submarine without compromising its position. For example, the ship and the submarine are positioned such that a passage or channel in a waterway can be monitored. The ship transmits a signal which includes as part of the encoded communication synchronization information indicative of the time that the signal is sent. The signal is received at the submarine, and the time difference between when the signal is sent (i.e. the decoded time) and when the signal was received provides an accurate determination of the time for the communication to travel from the ship to the submarine. The submarine thereafter receives a signal reflected off of the intruder on the bearing of the intruder. The bearing information and the time difference between the direct and reflected signal allows a determination of the position of the intruder, i.e., the range and bearing from the submarine.

Although the invention is illustrated and described as being used with a submarine and a helicopter having a dipping sonar, the invention will work equally as well with a ship having a trailing or hull mounted sonar. Additionally, the invention is described with a low frequency sonar system having five frequencies and five time pulse width selections; however, other sonar systems with at least two frequencies may be employed.

Although the invention has been illustrated and described with respect to exemplary embodiments thereof, it should be understood by those skilled in the art that the foregoing and various other changes, omissions and additions may be made therein and thereto, without departing from the spirit and scope of the present invention.

We claim:

1. Apparatus for underwater transmission of digitally encoded communications comprising:

acoustic transmitting means for converting an electrical transmit signal indicative of a digitally encoded communication to an acoustic signal comprised of a series of consecutive acoustic frequency pulses;

acoustic receiving means for receiving an acoustic signal comprised of a series of consecutive acoustic frequency pulses, and for converting said received acoustic signal to an electrical receive signal indicative of a digital encoded communication;

a plurality of keying means for providing a first logic signal indicative of a first acoustic frequency is response to the selective activation of one of said plurality of keying means, for providing a second logic signal indicative of a second acoustic frequency different from said first acoustic frequency in response to the selective activation of another of said keying means, and for providing a message signal indicative of a series of consecutive acoustic frequency pulses, the frequency of each of said pulses being equal to either said first acoustic frequency or said second acoustic frequency;

signal processing means for providing, in response to said first and second logic signals and said message signal, said electrical transmit signal to said acoustic transmitting means; and said signal processing means being responsive to said electrical receive signal for providing a first logic signal, for providing a second logic signal different from said first logic signal, and for providing a message signal indicative of a series of consecutive logic signals, each of said consecutive logic signals being indicative of either said first or second logic signals.

2. A method of underwater communication comprising the steps of:

selecting a first acoustic signal frequency to represent a first logic state;

selecting a second acoustic signal frequency different from said first acoustic signal frequency to represent a second logic state;

encoding a communication as a series of consecutive acoustic frequency pulses, the frequency of a first one of said pulses being equal to said first acoustic signal frequency, the frequency of a second one of said pulses being equal to said second acoustic signal frequency, the frequency of the remainder of said pulses being equal to either said first acoustic signal frequency or said second acoustic signal frequency;

transmitting said communication from a first locations receiving said communication at a second location; and decoding said communication.

* * * * *